United States Patent [19]

Wright et al.

[11] Patent Number: 5,141,177
[45] Date of Patent: Aug. 25, 1992

[54] MODEL FOLLOWING CONTROL SYSTEM

[75] Inventors: Stuart C. Wright, Woodbridge, Conn.; James B. Dryfoos, Wallingford, Pa.

[73] Assignees: United Technologies Corporation, Hartford, Conn.; The Boeing Company, Seattle, Wash.

[21] Appl. No.: 751,434

[22] Filed: Aug. 28, 1991

[51] Int. Cl.[5] .................... B64C 11/44; B64C 13/18; G05D 13/00
[52] U.S. Cl. ............................ 244/17.13; 244/175; 244/195; 364/434
[58] Field of Search .............. 244/17.13, 17.21, 175, 244/177, 180, 181, 191, 193, 195, 76 R; 364/432, 433, 434, 435

[56] References Cited

U.S. PATENT DOCUMENTS

| | | | |
|---|---|---|---|
| 3,057,584 | 10/1962 | Bretoi | 244/193 |
| 4,004,756 | 1/1977 | Gerstine et al. | 244/17.13 |
| 4,106,094 | 8/1978 | Land | 364/434 |
| 4,527,242 | 7/1985 | McElreath et al. | 364/432 |
| 4,573,125 | 2/1986 | Koenig | 364/434 |
| 4,697,768 | 10/1987 | Klein | 364/434 |
| 5,008,825 | 4/1991 | Nadkarni et al. | 364/434 |

Primary Examiner—Sherman D. Basinger
Assistant Examiner—Virna Lissi Mojica
Attorney, Agent, or Firm—Richard H. Kosakowski

[57] ABSTRACT

An aircraft flight control system including model following control laws includes improved logic and algorithms to limit the error between a desired parameter value from the output of a model and an actual parameter value. Such logic is operable to sense the amount of said parameter error and to limit the amount of the error if it exceeds a predetermined value. The difference between the predetermined limit and the actual error is fed back to the model such that the output of the model is adjusted so that the error between the desired and actual parameter values does not exceed the predetermined value.

17 Claims, 4 Drawing Sheets

MODEL FOLLOWING CONTROL SYSTEM

The Government has rights in this invention pursuant to a contract awarded by the Department of the Army.

DESCRIPTION

1. Technical Field

This invention relates to aircraft flight control systems, and more particularly to a model following control system which limits the model output with respect to the variables being controlled.

2. Background Art

Aircraft flight control systems employing model following control laws are desirable because the designer can tailor the response dynamics and control bandwidth of the aircraft by placing those features into a model and then forcing the aircraft to follow that model. For proper operation, the aircraft and model must be matched to a relative extent so that the model does not attempt to make the aircraft do something that it cannot physically do.

On the other hand, the designer usually desires a relatively simple and predictable model so as to understand the performance that will be asked of the aircraft. A very detailed nonlinear model would be required to exactly represent the capabilities of the aircraft, if indeed such an exact model could be achieved at all. Parameters such as altitude, airspeed, rotor angle of attack, gross weight, center of gravity, outside air temperature, etc., all affect the dynamics and capabilities of the helicopter, making it virtually impossible to exactly model the aircraft.

A complex model would also require extensive testing for validation, and the model's response would have to be predictable to the designers and pilots. Additional software would be needed to represent such a complex model. This software must be put into the flight control computers and run in real time. All of the foregoing tasks become more difficult as the model's complexity increases.

A problem with model following control systems arises when errors build up between the model (which is commanded by pilot inputs) and the aircraft (which is commanded by control system inputs). When these errors grow too large, excessively large control commands can be generated which can upset the stability of the aircraft and make the aircraft response to pilot inputs unpredictable. The physical meaning of these errors growing too large is that the model is getting too far ahead of the aircraft for the aircraft to reasonably catch up; thus, unreasonable control commands get generated.

In the prior art, the above problem is partially negated by purposely avoiding situations that tend to make the aircraft not follow the model, such as aggressive or high performance maneuvers. However, this avoidance artificially limits the performance capabilities of the aircraft.

Another prior art solution is simply to limit the error between the model and the aircraft. This reduces the intensity of oscillations resulting from overdriving the control system, but does not address the unpredictability of the response. For example, with a rate command/attitude hold model following design in the pitch axis, if the pilot were to release force on the controller at 10 degrees nose up attitude, the pilot would expect the aircraft to maintain that attitude. But if the model is at 10 degrees nose down when the force is released, the control system will bring the aircraft to where the model wants it to be, which in this case is not where the pilot wants or expects it to be. Thus, this simple error limiter allows large steady state errors to build up between the model and the aircraft. This eventually produces what appears to the pilot to be an uncommanded input to the control system.

DISCLOSURE OF THE INVENTION

An object of the present invention is to provide an aircraft flight control system which utilizes model following control laws that allow for a simple and predictable model of the aircraft to be used.

Another object of the present invention is to provide an aircraft flight control system which utilizes model following control laws which limit the error between the model output and the dynamically changing control system variable being modelled.

According to the present invention, an aircraft flight control system including model following control laws has means to limit the error between a desired parameter value from the output of a model and an actual parameter value, such means senses the amount of said parameter error and limits the amount of the error if it exceeds a predetermined value, the difference between the predetermined limit and the actual error is fed back to the model such that the output of the model is adjusted so that the error between the desired and actual parameter values does not exceed the predetermined value.

The present invention operates within a model following control system to limit the amount of error between the output of the model and the actual value of a dynamically changing aircraft parameter or variable, such as attitude for the pitch and roll axes, heading for the yaw axis, and altitude for the lift axis. In this way an excessive build up of errors that could lead to overcontrolling of the aircraft are avoided. Thus, a stable and predictable control system response is achieved.

These and other objects, features and advantages of the present invention will become more apparent in light of the following detailed description of a best mode embodiment thereof as illustrated in the accompanying drawings.

BEST MODE FOR CARRYING OUT THE INVENTION

Figure 1:
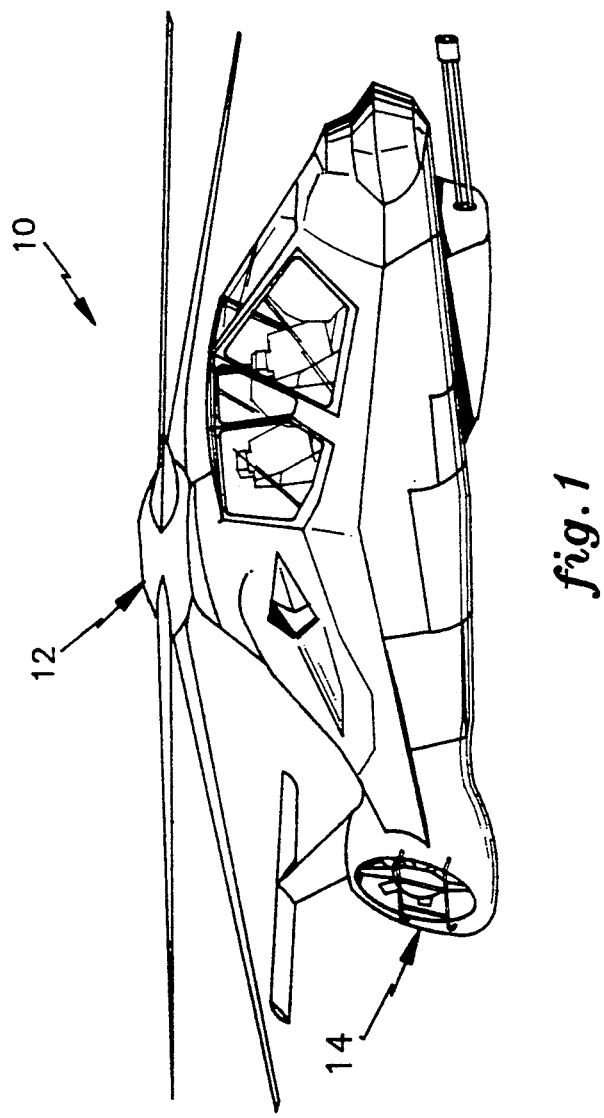
FIG. 1 is an illustration of an aircraft having a flight control system embodying the present invention.

FIG. 1 is a pictorial illustration of a helicopter embodiment of a rotary winged aircraft 10 in which the present invention may be used. The helicopter 10 includes a main rotor assembly 12 and tail rotor assembly 14.

Figure 2:
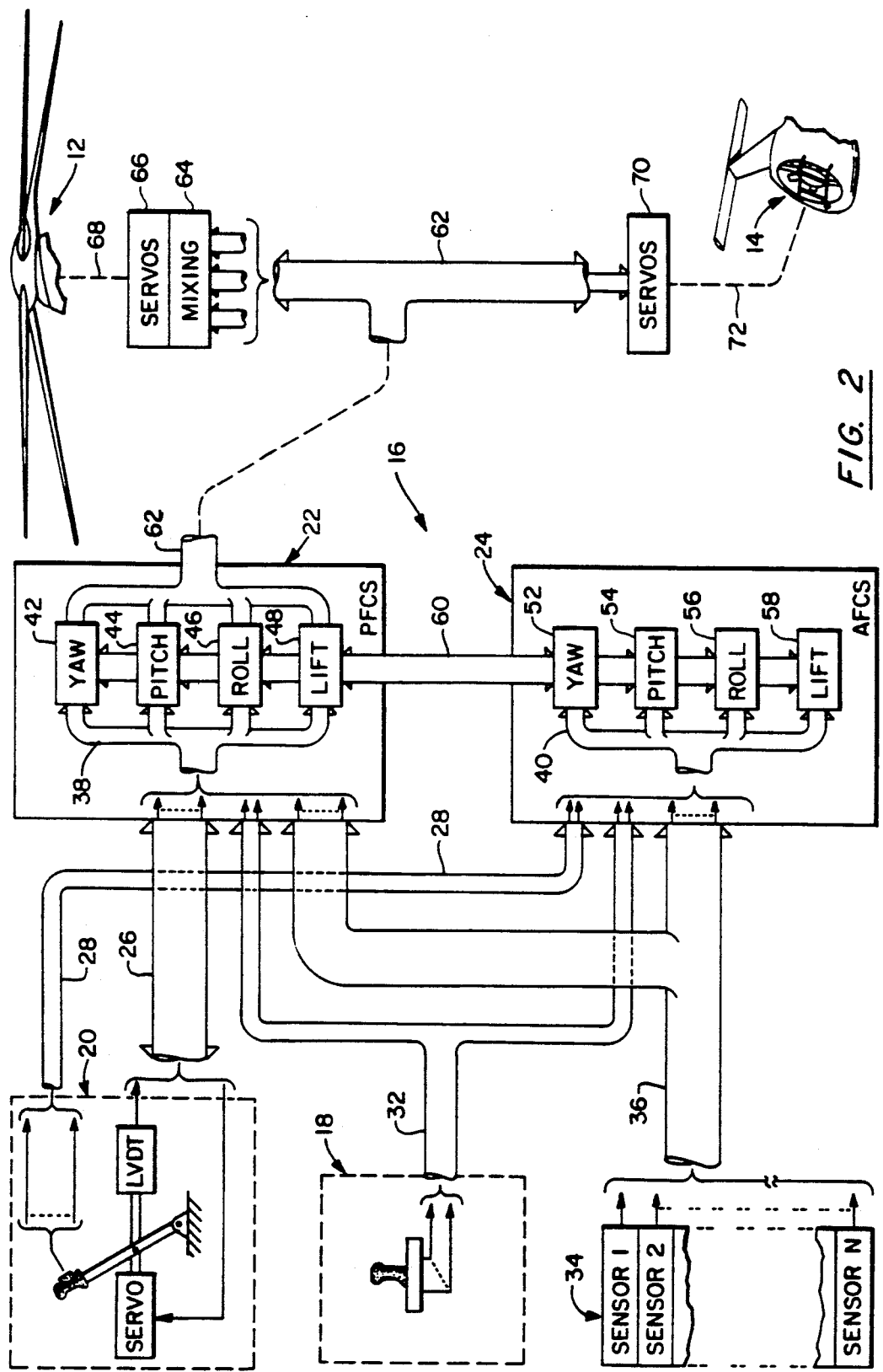
FIG. 2 is a block diagram of a flight control system as in FIG. 1.

Referring to the block diagram of FIG. 2, the flight control system 16 of the present invention utilizes a model following control system. The system 16 shapes the commands from a well known pilot four axis sidearm controller 18 and/or displacement stick 20 through an inverse vehicle model to produce a desired aircraft response. The system 16 includes a Primary Flight Control System (PFCS) 22 and an Automatic Flight Control System (AFCS) 24.

The PFCS 22 receives displacement command output signals from the displacement stick 20 on lines 26. The AFCS 24 receives discrete output signals from the displacement stick 20 on lines 28. The PFCS and AFCS each receive the force output signals of the sidearm controller 18 on lines 32. The PFCS and AFCS each also receive the aircraft's sensed parameter signals from sensors 34 on lines 36. The pilot command signals on lines 26, 28, 32 and the sensed parameter signals on lines 36 are illustrated as being consolidated within trunk lines 38, 40 in the PFCS 22 and AFCS 24, respectively.

The PFCS and AFCS each contain logic for controlling the yaw, pitch, roll and lift axes of the aircraft 10. In FIG. 2 these logic modules are illustrated by blocks 42, 44, 46, 48 for the PFCS and blocks 52, 54, 56, 58 for the AFCS. The PFCS logic modules 42-48 provide signals to command the rotor position, while the AFCS logic modules 52-58 provide conditioning and/or trimming of the functions within the four logic modules of the PFCS. The PFCS and AFCS logic modules are interconnected through a signal bus 60.

As described in detail hereinafter, the PFCS and AFCS utilize a model following algorithm in each of the four control axes to provide the rotor position command signals on lines 62 to a main rotor mixing function 64. This mixer 64 commands displacement of mechanical servos 66 and linkages 68 to control the tip path plane of the main rotor 12. Rotor command signals are also provided on the lines 62 to the tail rotor servos 70 which control the thrust of the tail rotor 14 through linkages 72. The sensed parameter signals on the lines 36 from the sensors 34 provide the PFCS 22 and AFCS 24 with, e.g., the aircraft's angular rate and attitude response about each axis to the aforedescribed rotor command signals.

Figure 3:
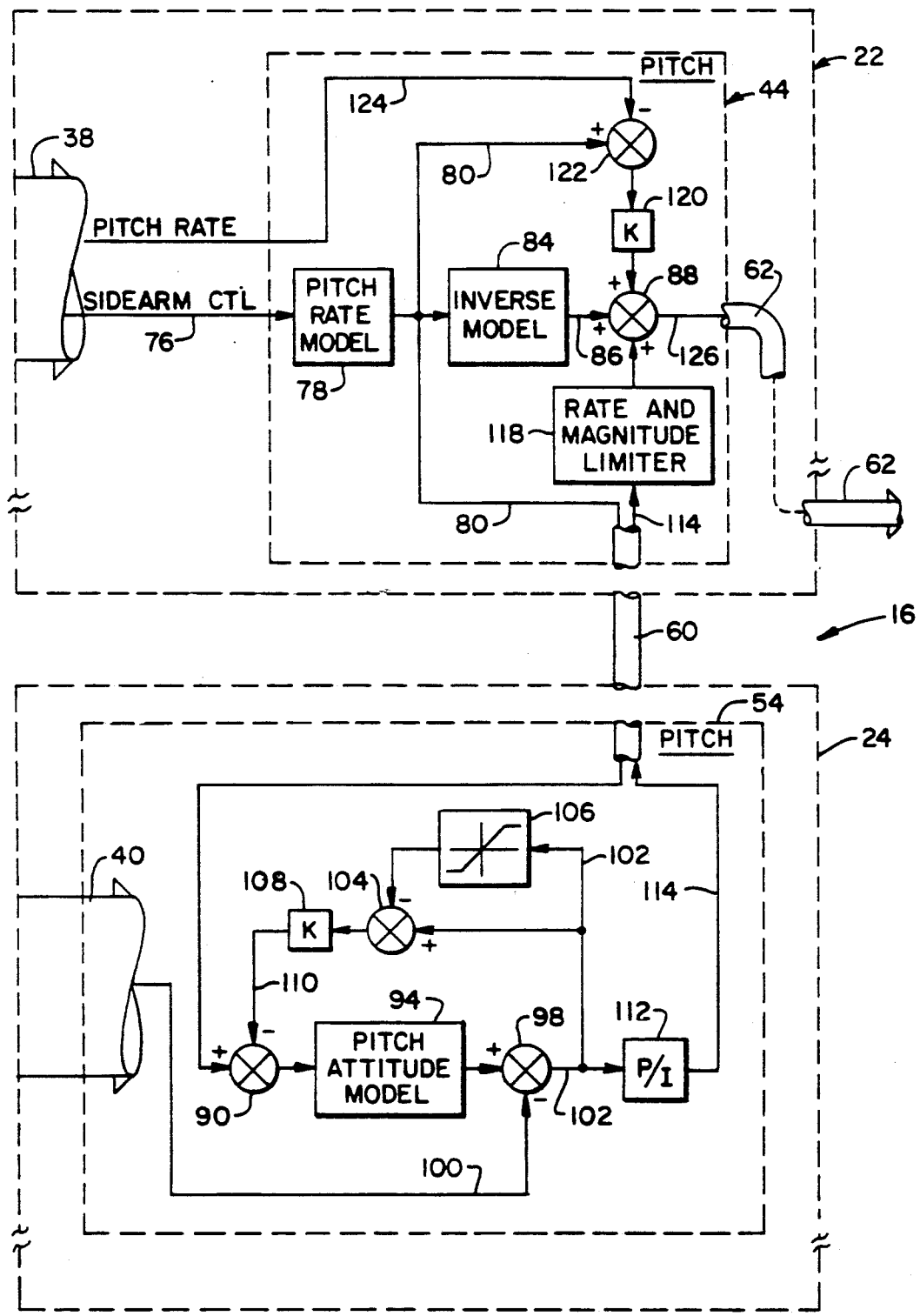
FIG. 3 is a detailed block diagram of a portion of the flight control system of FIG. 2 having the present invention embodied therein.

FIG. 3 is a detailed block diagram of a portion of the flight control system 16 of FIG. 2 in which the present invention can better be seen. In FIG. 3 is illustrated the functional interconnection of the PFCS pitch logic module 44 and the AFCS pitch logic module 54. The PFCS pitch logic module receives a pitch axis command signal on a line 76, provided through trunk lines 38 and lines 32 from the sidearm controller 18. The pitch command signal is generated by the pilot's imparting a force on the sidearm controller in the direction of the desired pitch.

The pitch command signal on the line 76 is fed to a pitch rate model 78. The model 78 comprises, e.g., a first order derivative lag filter that provides a desired pitch rate signal on a line 80 indicative of the desired rate of change of the aircraft attitude about the pitch axis. Selection of the pitch rate model order of magnitude is dependent on the dynamics of the aircraft and the pitch response desired.

The desired pitch rate signal on the line 80 is fed to a pitch axis vehicle inverse model 84. The inverse model is a Z transform model, which may be embodied as a first order lead filter. Together the pitch rate model 78 and inverse model 84 provide a feedforward path for the sidearm control signal on line 76. The inverse model provides an output signal indicative of the control command required to provide the desired pitch rate on a line 86 to a summing junction 88.

The feedforward path provides the primary control input to the main rotor assembly which causes the helicopter to pitch at a rate set by the desired pitch rate signal. This primary control input represents the main rotor command necessary to achieve the desired pitch axis rate of change of the aircraft for each pilot commanded maneuver.

The desired pitch rate signal is also fed through the bus 60 to the AFCS pitch logic module 54 within which it is fed to a first summing junction 90. The output of the junction 90 is fed to a pitch attitude module 94 which may comprise, e.g., an integrator. The output of this integrator on a line 96 is indicative of commanded aircraft pitch attitude and is fed to a second summing junction 98. A second input to the junction 98 is the actual aircraft pitch attitude on a signal line 100. The actual pitch signal originates from a pitch attitude sensor (e.g., a gyro) which is one of the sensors 34 illustrated in FIG. 1. The actual pitch signal comprises one of the signal lines 36 and 40 leading into the AFCS pitch module 54.

The second summing junction 98 compares the desired and actual pitch attitude signals and provides a signal on a line 102 indicative of any difference therebetween. In accordance with the present invention, this pitch error signal is fed to a third summing junction 104 and to an amplitude limiter 106. The amplitude limiter comprises a map function which clamps (i.e., limits) the amount of difference or error between the desired and actual pitch signals.

For example, if the pitch error exceeds ten (10) degrees (e.g., 14 degrees), the error signal on the line 102 is indicative of 14 degrees while the amplitude limiter limits the error to 10 degrees. The third summing junction 104 then takes the difference between the error and the limit, the difference being 4 degrees in this example. The difference is fed to a gain stage 108 and then on a line 110 to the first summing junction 90. The purpose of the gain stage 108 is to control how tightly the model output is adjusted such as to limit the error between the model and the pitch attitude (i.e., a large gain provides a hard limit and a low gain a soft limit).

The first summing junction takes the difference between the pitch error difference signal on the line 110 and the desired pitch rate signal on the line 80. Any difference between the two signals drives the pitch attitude model 94 to adjust its output on the line 96 so that the model output stays within, e.g., ten degrees of the actual aircraft pitch. It is to be understood that ten degrees is purely exemplary; any quantifiable limit on error may be used depending upon the application of the present invention. The adjusted pitch model output is compared to the actual pitch in the second summing junction 100 where now the output thereof is indicative of ten degrees or less of error between desired and actual pitch.

The second summing junction output signal on the line 102 is also fed to a proportional and integral compensation stage 112 which converts the signal to an AFCS control command in percent of control authority. This control command signal is fed on a line 114 through the bus 60 to a rate and magnitude limiter 118 in the PFCS. The limiter limits the rate and amplitude of the AFCS command signal to protect the PFCS 22 from any generic AFCS failures. In essence, the PFCS provides the mechanical system equivalent of a simple yet highly reliable link between the pilot and the rotor command. The AFCS, on the other hand, is not as simple or reliable; thus, the PFCS has to be protected from the AFCS.

The limited AFCS command signal from the limiter 118 is fed to the summing junction 88 where it is summed with the PFCS command signal on the line 86. The summing junction also has input thereto a signal from a rate gain stage 120. The input to the rate gain 120 is fed from a summing junction 122, which takes the difference between the desired pitch rate signal on the line 80 and the actual pitch rate signal on a line 124. The actual pitch rate is sensed by one of the sensors 34 and provided as a signal on one of the lines 36, trunk 38 and signal line 124.

The resultant output signal from the summing junction 88 is the total PFCS command signal on a line 126. The total command signal is fed through the lines 62 to the mixer 64 which converts the pitch axis command to a rotor actuator command.

Figure 4:
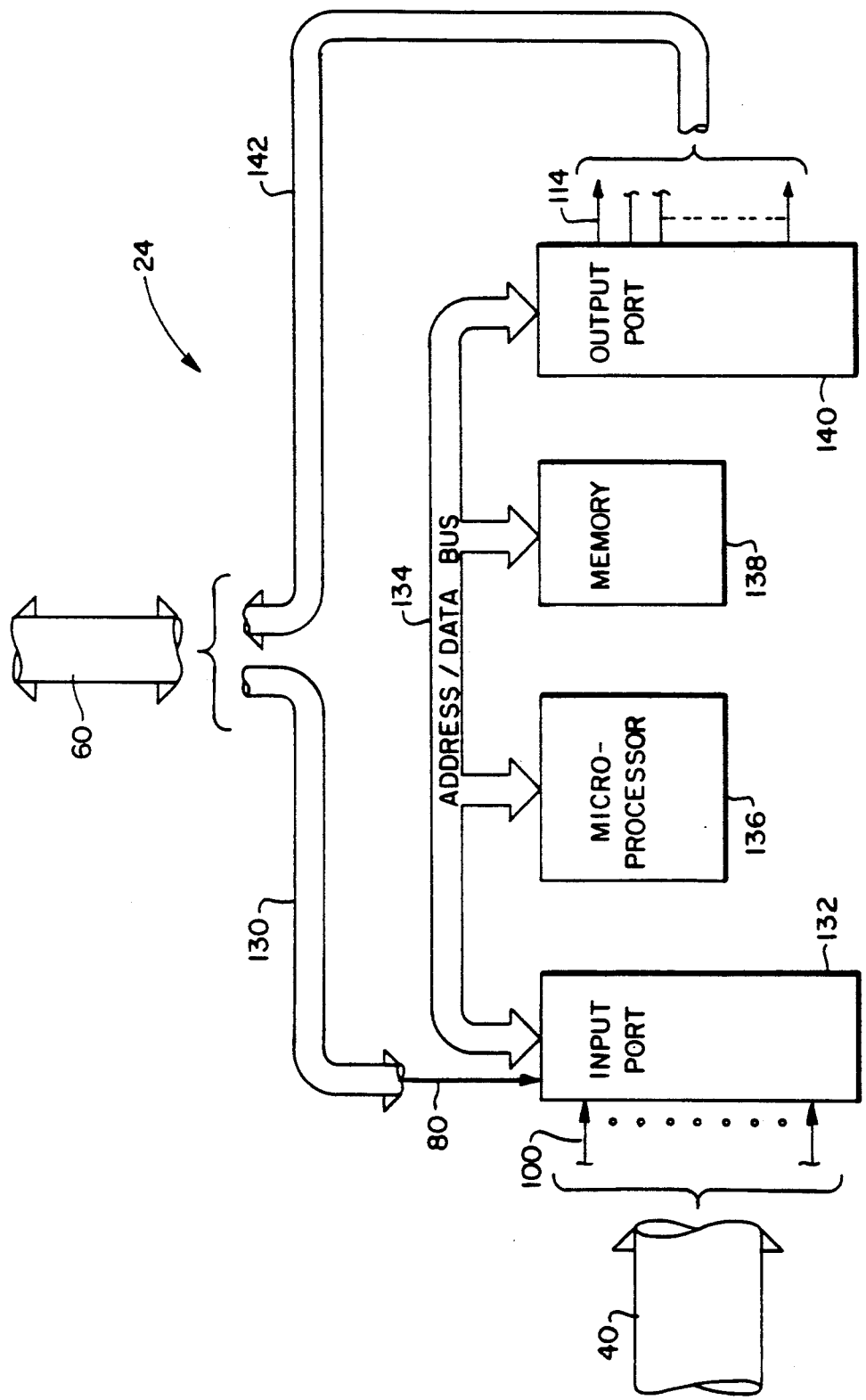
FIG. 4 is a block diagram of a microprocessor embodiment of a portion of the flight control system of FIG. 2.

The contemplated best mode embodiment of the AFCS is microprocessor-based in which the algorithms of the AFCS logic modules 52-58 reside in executable program listings stored in memory. In FIG. 4 is illustrated a microprocessor-based AFCS. The desired pitch rate signal on the line 80 is received from input lines 130 included within the lines 60 interconnecting the PFCS 22 and AFCS 24. The sensed pitch signal on the line 100 comprises one of a number of input signals to the AFCS. The signal on the line 100 is received from the trunk lines 40 at an AFCS input port 132. Depending on the format of the input signals (analog or digital) the input port 132 may comprise an analog-to-digital (A/D) converter, a frequency-to-digital (F/D) converter, or any other known signal conditioning functions.

The input port is connected through an address/data bus 134 to a microprocessor 136 (e.g., Intel model 80286, Motorola model 68020), memory 138 (e.g., RAM, UVPROM, EEPROM), and an output port 140. The output port 140 may comprise a digital-to-analog (D/A) converter, a parallel-to-serial converter, a discrete output driver, or any other known signal conversion functions which transform the AFCS digital signal format to that required by the control system. Signal lines 142 from the output port 140, including the signal line 114 to the PFCS pitch logic module 44, are fed to the bus 60.

The present invention operates within a model following control system to limit the amount of error between the output of the model and the actual value of a dynamically changing aircraft parameter or variable, such as attitude, heading or altitude about the appropriate axis (e.g., pitch, roll, yaw, lift). In this way an excessive build up of errors that could lead to overcontrolling of the aircraft are avoided. Thus, a stable and predictable control system response is achieved.

The present invention is not limited to a microprocessor based control system; alternatively, model following control system may be implemented with either digital or analog electronic components. Further, the present invention is described for use in logic that control the pitch attitude of an aircraft. However, it is to be understood that the invention may be used with the other axes of an aircraft, namely, the roll, yaw and lift axes, in a manner that should be apparent to one of ordinary skill in the art in light of the teachings herein. Or, the invention may be used with other dynamic parameters that are modeled, such as airspeed, ground-speed, position, etc. also in a manner that should be apparent in light of the teachings herein.

All the foregoing changes and variations are irrelevant to the present invention; it suffices that an aircraft flight control system including model following control laws has means to limit the error between a desired parameter value from the output of a model and an actual parameter value, such means is operable to sense the amount of said parameter error and to limit the amount of the error if it exceeds a predetermined value, the difference between the predetermined limit and the actual error is fed back to the model such that the output of the model is adjusted so that the error between the desired and actual parameter values does not exceed the predetermined value.

Although the present invention has been shown and described with respect to a best mode embodiment thereof, it should be understood by those skilled in the art that various other changes, omissions and additions to the form and detail of the thereof, may be made therein without departing from the spirit and scope of the invention.

We claim:

1. A model following control system for an aircraft, comprising:

input means, for providing a parameter signal indicative of a desired value of an aircraft parameter;

command model means, responsive to said parameter signal, for providing a command signal indicative of a desired value of an aircraft parameter to be controlled;

sensing means, for providing one or more sensed signals indicative of actual values of one or more corresponding aircraft parameters;

first comparison means, for comparing one of said sensed parameter signals with said command signal and for providing an error signal indicative of any difference therebetween, said one of said sensed parameter signals being indicative of an actual value of the aircraft parameter to be controlled;

limit means, for limiting a value of said error signal to a predetermined value if said value of said error signal exceeds said predetermined value, and for providing a limited error signal indicative thereof;

second comparison means, for comparing said error signal with said limited error signal and for providing a difference signal indicative of any difference therebetween; and third comparison means, for comparing said difference signal with said parameter signal and for adjusting the value of said parameter signal as a result of any difference therebetween, whereby the value of said parameter signal is adjusted such that the value of said command signal indicative of a desired value of an aircraft parameter to be controlled is controlled by the model following control system to within a certain allowable variance with said one of said sensed parameter signals indicative of the actual value of the aircraft parameter to be controlled.

2. The control system of claim 1, wherein said input means comprises a sidearm controller.

3. The control system of claim 1, wherein said input means comprises a four axis sidearm controller.

4. The control system of claim 1, wherein said aircraft parameter is pitch attitude.

5. The control system of claim 1, wherein said aircraft parameter is roll attitude.

6. The control system of claim 1, wherein said aircraft parameter is yaw heading.

7. The control system of claim 1, wherein said aircraft parameter is lift altitude.

8. The control system of claim 1, further comprising:
second command model means, responsive to said parameter signal provided by said input means, for adjusting a value of said parameter signal as a function thereof; and
inverse model means, responsive to said second command model means, for providing a first control signal as a function of said parameter signal.

9. The control system of claim 8, wherein said inverse model means comprises a lead filter.

10. The control system of claim 1, wherein said second command model means comprises rate model means responsive to said parameter signal for providing said conditioned signal as a function of a rate of change of said parameter signal.

11. The control system of claim 10, wherein said rate model means comprises a first order derivative lag filter.

12. The control system of claim 8, further comprising:
fourth comparison means, responsive to said second command model means, for comparing said parameter signal with one of said sensed signals indicative of actual values of one or more corresponding aircraft parameters, and for providing an adder signal indicative of any difference therebetween.

13. The control system of claim 12, further comprising:
adder means, for adding a value of said first control signal with a value of said error signal and for providing a total control signal for control of the aircraft, and being responsive to said adder signal for adding a value of said adder signal to a value of said total control signal.

14. The control system of claim 1, further comprising:
limiter means, responsive to said error signal, for limiting the rate and magnitude of a value of said error signal.

15. The control system of claim 1, further comprising:
compensation means, responsive to said error signal, for providing for dynamic compensation of said error signal in the form of percent of control authority.

16. The control system of claim 15, wherein said compensation means comprises proportional plus integral compensation.

17. The control system of claim 1, wherein said command model means comprises an integrator for providing said command signal as an integrated function of said conditioned signal.

* * * * *